Oct. 22, 1957     L. A. M. PHELAN     2,810,557
FREEZER MECHANISM
Filed Aug. 16, 1956
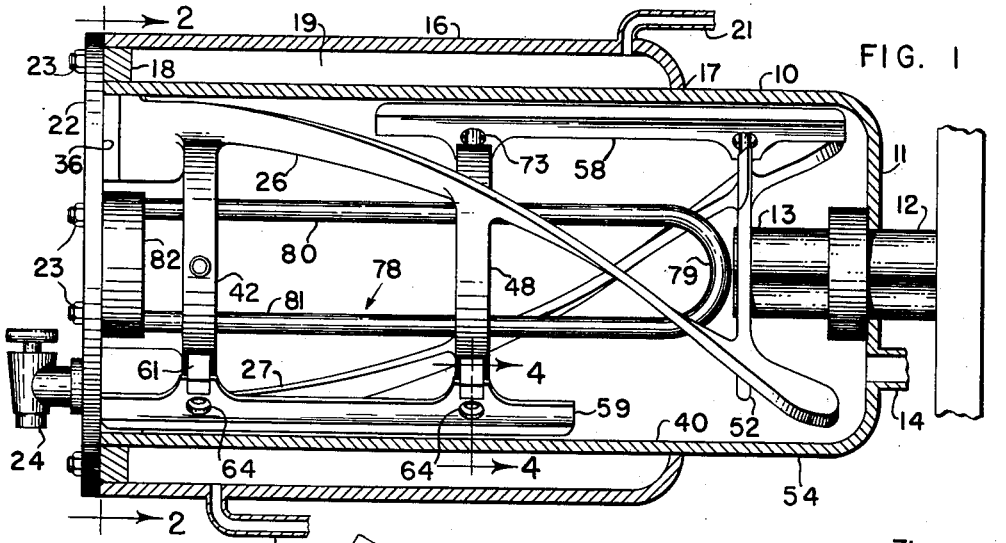
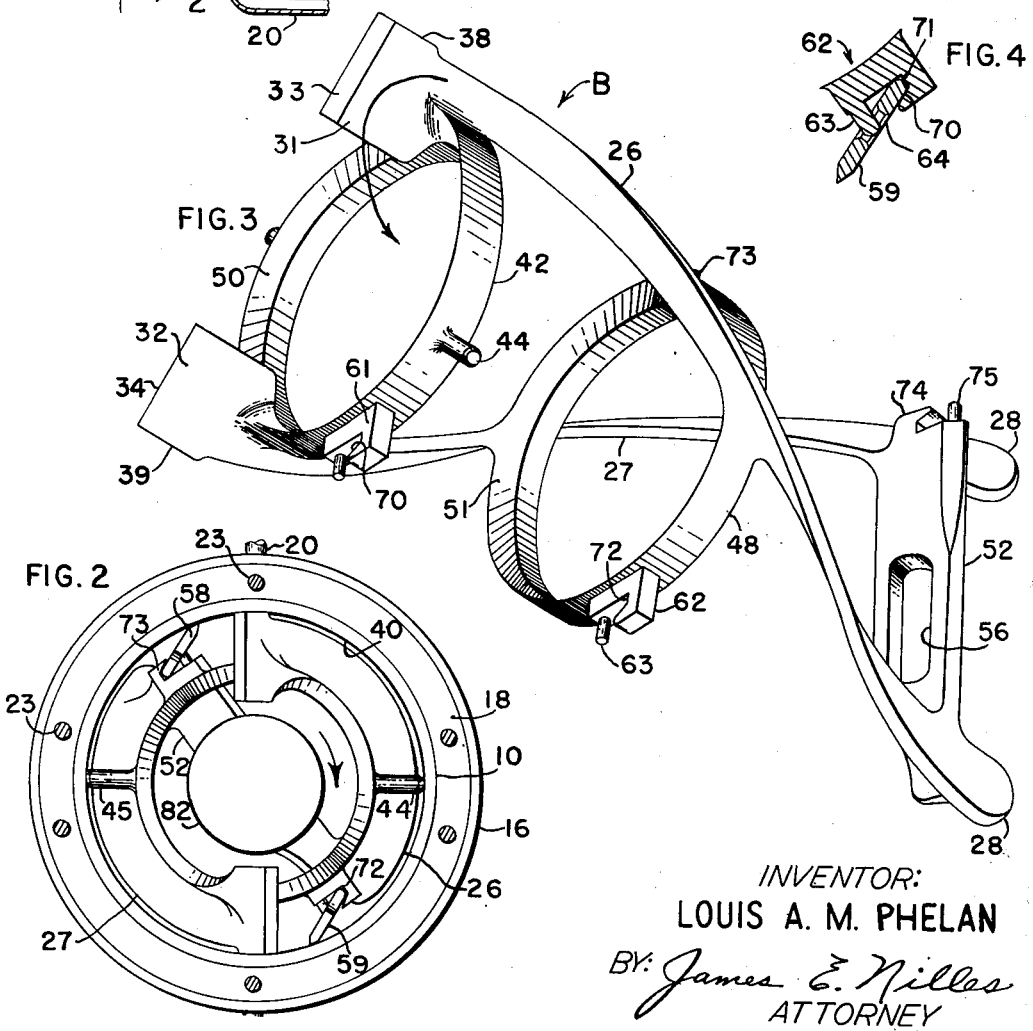
INVENTOR:
LOUIS A. M. PHELAN
BY: *James E. Nilles*
ATTORNEY

United States Patent Office 2,810,557
Patented Oct. 22, 1957

2,810,557

FREEZER MECHANISM

Louis A. M. Phelan, Rockton, Ill.

Application August 16, 1956, Serial No. 604,481

9 Claims. (Cl. 259—109)

This invention relates generally to freezing mechanisms for ice cream, custards and similar material of the type in which the mix is fed into one end of a freezing chamber, thoroughly mixed and aerated and simultaneously fed to the other end of the chamber where it is discharged as an edible frozen product. More particularly the invention relates to an improved rotary beater for such a freezer which efficiently performs these three functions of mixing, aerating and feeding the mix and in addition serves to scrape the inside wall of the freezing chamber free of ice which would otherwise accumulate thereon.

The type of mix used in the preparation of frozen foods of this type usually consists of various combinations of water, sugar, flavor, fats and other minor ingredients. The resulting mixture is both highly cohesive and adhesive which makes it difficult to thoroughly mix for proper texture and difficult to beat the required volume of air therein for proper overrun characteristics. The mixture is also difficult to feed in a positive and continuous manner. Because of these mix properties the mechanism is often difficult to clean, a task which must be done periodically.

These beaters are positively driven and have high torque characteristics because a considerable force is required to scrape the inner wall of such a freezing cylinder free of ice. In practice these beaters sometimes become completely mangled due to the resistance of the ice, and require complete replacement. It is therefore necessary to provide a beater which will not distort to cause misalignment between the parts.

It is therefore an object of the present invention to provide a beater for a freezer of the above type, which is of simple design and permits free flow of the product and yet is extremely strong and rigid. This high strength-weight ratio beater is also very efficient in performing its intended functions above referred to.

It is another object of the invention to provide a freezer beater of clean and simple design which facilitates the cleaning thereof.

It is another and important object of the invention to provide a freezer beater which produces a highly desirable flow pattern of mix material within the freezing chamber, and which insures proper turbulence and aeration as well as positive and complete feed of the product from the chamber.

It is an important object of the invention to provide a beater for a freezer of the above type, which is mounted only at its rear end and yet is accurately located at its forward end to maintain operating tolerances that are necessary for proper functioning of its elements. The particular means for supporting the front end of the beater contributes to a very desirable flow pattern.

It is still another object of the invention to provide a retarder for a beater of the above type which promotes turbulence and aeration of the product and yet does not obstruct the general flow pattern of the material in the freezer cylinder.

It is another object of the invention to provide a beater for a freezing cylinder of the above type, which has helical screws for feeding the mix material forwardly in a generally axial direction adjacent the freezing cylinder walls, said beater also having a completely open center which permits the unobstructed return flow of material in an axial rearward direction to complete the flow pattern.

It is generally an object of the invention to provide a continuous freezer of the type above referred to having an improved beater and retarder which are highly efficient in performing the functions for which they were designed.

Other objects and advantages will become more apparent from the following detailed description taken in conjunction with the attached sheet of drawings in which by way of preferred example only is illustrated the invention. Accordingly, the present invention may be considered as comprising the various constructions, combinations or sub-combinations of parts as is hereinafter more fully set forth in the detailed description and in the claims, reference being had to the accompanying drawings in which:

Figure 1 is a side elevational view in section showing the improved beater and retarder as used in a cylindrical type freezer.

Figure 2 is a front end elevational section taken on line 2—2 of Figure 1.

Figure 3 is a perspective view of the rotary beater shown in Figure 1 but on an enlarged scale.

Figure 4 is a sectional view taken on line 4—4 of Figure 1, but on an enlarged scale, showing the blade and means for detachably mounting it to the beater.

Referring more particularly to the drawings, the freezer includes a generally horizontally disposed drum or cylinder 10 having an integrally formed rear wall 11 through which extends a drive shaft 12. The means for supporting and sealing the drive shaft in the rear wall forms no part of the present invention but, if desired, reference may be had to my U. S. Patent Number 2,314,598, issued March 23, 1943, and entitled, "Insulated Freezer Shell and Transmission." It is believed sufficient to say the shaft is usually driven by an electric motor through a flexible belt and is rotatably mounted and effectively sealed in the rear wall. The shaft 12 terminates at its inner end 13 which is non-circular in cross section to form a quick detachable driving engagement with the rear end of the rotary beater B. Fresh mix is supplied to the cylinder 10 via the supply conduit 14 extending through the rear wall. A second cylinder 16 is concentrically located around cylinder 10 and is secured thereto at 17 as by welding and at its front end by means of the intermediate member 18. The outer cylinder 16 thus forms a freezing jacket having an annular passage 19 to which refrigerant is introduced by conduit 20 and from which it passes through conduit 21. A front cover 22 is detachably secured by bolt means 23 to the freezer chamber and has a manually operated serving valve 24 adjacent its lower side. Fresh mix is thus introduced in accordance with the demand at the rear end of the freezer and is discharged at the front end by the serving valve as an edible frozen product.

As the mix passes through the freezer it must be completely mixed for proper texture. A considerable amount of air must also be whipped or beaten into the mix and the amount of this aeration determines overrun characteristics desired in the particular type of product being made. The resulting product is often highly cohesive and adhesive, has a high coefficient of viscosity and is of a fluffy and lightweight nature. These characteristics make the product rather unwieldly to handle, difficult to feed in a positive manner and maintain in a proper condition of texture.

Many prior art devices have been proposed and used somewhat successfully in the past. For example, the beater shown in my U. S. Patent Number 2,243,317, issued May 27, 1941, and entitled, "Counter Freezer," was economical to manufacture but, due to the extreme strength and rigidity required of such beaters, it often became completely bent out of shape because of the lack of mechanical strength. Furthermore, the numerous parts and joints in certain prior devices make them difficult to clean, while others do not promote adequate turbulence, thorough mixing and provide a good flow pattern of the product.

In accordance with the present invention, the beater B shown for illustrative purposes is generally of elongated and cylindrical shape. It includes a pair of helical screws 26, 27 circumferentially spaced apart and shown here as being disposed on diametrically opposed sides of the beater. Their rear ends 28 terminate adjacent the rear wall 11 and their front ends terminate in enlarged portions 31, 32. The front beveled edges 33, 34 of the enlarged paddle portions 31, 32 respectively, move closely adjacent the inner surface 36 of the cover plate 22 to force the product out the serving valve. The enlarged portions 31, 32 also have a peripheral edge 38, 39 respectively, which form a diameter slightly larger than that formed by the screws 26, 27. Edges 38, 39 are adapted to form a running fit with the inner wall 40 of the cylinder 10 and form two bearing points for rotatably supporting the front end of the beater within the freezer. Thus the major portion of the length of the screws do not come in contact with the inner wall 40. Due to variables in manufacturing and assembly, the inner wall 40 of cylinder 10 may not be exactly round in cross section and if screws 26, 27 made scraping contact with inner wall 40, any eccentricity, due for example to a slightly oval-shaped cylinder, would cause binding between the moving parts and consequently wear or breakage thereof. A front ring member 42 is rigidly secured as by welding between and adjacent the front ends of screws 26, 27, the welds being ground smooth and forming an indistinguishable joint. The front ring 42 includes a pair of posts 44, 45 which are welded thereto in diametrically opposed relationship and circumferentially spaced from the screw bearing portions 38, 39. The radially outer ends of posts 44, 45 also form a running fit with the inner wall 40 of the cylinder 10 and thus together with bearing portions 38, 39 afford four points for rotatably supporting the beater within the cylinder. It should be noted the beater has no central bearing shaft or other structure at its front central portion and forms no obstruction to material flow in this area, the full significance of which will later become apparent.

An intermediate ring 48 is similarly welded to screws 26, 27 intermediate their length, these welds also being indistinguishable after grinding and polishing. It will be noted that both open-center members or rings 42 and 48 are arranged transversely in respect to the axis of rotation and are comparatively large in diameter. The number and spacing of these rings may of course be varied depending on the length of the beater. The front edges of the rings 42, 48 have a tapered edge 50, 51 respectively, which facilitates material flow therethrough in a rearward direction as will appear more fully hereinafter.

The rear ends 28 of the screws are rigidly connected by a rear member 52 which is the nature of a central plate of rather narrow proportions as compared to the rings. Member 52 is similarly welded to screws 26, 27 and the resulting junctures are of smooth and clean design.

It has been found unnecessary to make the rear member 52 of circular shape, as are rings 42, 48 because the desirable axial flow pattern of the material within the cylinder in this rear area is such as to not require an open central portion of the beater here. Therefore, the rear member 52 is also utilized to provide a driving connection with the drive shaft 12. For this purpose, as shown in Figure 3, a non-circular aperture 56 is provided in member 52 which mates with the portion 13 of the shaft to form an easily disconnectible slip fit therewith. When the front cover plate 22 is removed the beater is simply pulled forward out of engagement with shaft 12. Shaft 12 thus accurately and positively locates the rear end of the beater for being rotatably driven in the freezing cylinder.

A pair of axially staggered and circumferentially spaced scraping blades 58, 59 are loosely mounted on the periphery of the beater for keeping the inner wall 40 of the cylinder free of ice or other frozen matter to avoid interference with the moving parts, such as feed screws 26, 27. Otherwise the ice would build up to such an extent to cause mangling of the beater; literally tearing it apart. Due to the possible eccentricity of the cylinder 10, before mentioned, these blades must be able to freely follow the contour of the inner wall 40. This is particularly important in order to prevent marring or galling of the cylinder wall, which is made from stainless steel and also to prevent galling, bending or breaking of the scraper blades.

The front blade 59 is mounted in brackets 61, 62 welded on the periphery of rings 42, 48 respectively, in axial alignment. These brackets are identical and only one will be described. The brackets have an integral post 63 extending radially outwardly therefrom over which the apertures 64 of the blades are placed. The scraping blades must apply considerable force in order to remove frozen material from the cylinder wall and a particularly efficient mounting has been provided for absorbing this thrust. An open ended slot 70 is provided which faces in the direction of beater rotation. The rear edge 71 of the blade is rounded and in operation bears against the rear wall 72 of slot 70.

The rear blade 58 is similarly attached to bracket 73 of ring 48 and to rear member 52. The only difference is that the bracket 74 (Figure 3) and its post 75 on the rear member are formed integrally with member 52 as a single piece. However, whether the bracket is welded on or formed integrally is immaterial. If additional transverse rings are used as in the case of a longer beater, the rear member 52 may not require any bracket.

The blade is held firmly against the wall 40 in scraping engagement by the action of the frozen material being removed by the blade. Centrifugal force also swings the blades outwardly tending to hold them against the wall.

In some freezers of this general type which used helical blade beaters of conventional design, the material being treated is often simply revolved around the freezer cylinder without being thoroughly mixed. Stated otherwise, the material should be whipped or beaten in order to become properly aerated and mixed for good texture. For example with a device of the type disclosed in U. S. Patent Number 2,645,911, issued July 21, 1953, the material is often simply revolved around the cylinder with the screw and its shaft. In other words the material on one side of the large central shaft will not be mixed with the material on the diametrically opposite side. It is desirable to "knead" the material or fold one portion of the mix into another in order that the mix is completely homogenous. In accordance with one aspect of this invention, in order to provide the necessary turbulence for this thorough mixing, a stationary retarder 78 is provided which extends through the central open portion of the beater. While acting to hold the mass of material from turning as a body and creating the necessary turbulence in the material being moved by the beater, the retarder does not impede the return or rearward flow of the material through the central open portion and therefore does not disturb the general flow pattern. The retarder is shown here for illustrative purposes as a rod-like member which is elongated and bent into a U-shaped configuration having a bight portion 79 terminating adjacent the end 13 of the drive shaft. The eccentrically located legs 80, 81 of the retarder are welded to a disc 82 which in turn is welded to cover plate 22. The entire retarder is thus removable with the cover plate.

In operation, the fresh mix material is fed into the chamber through conduit 14. The rotation of the beater causes the mix to be carried by the screws generally along the cylinder wall 40 in a substantially axial direction toward the front cover plate. As the mix reaches the front end of the cylinder, and assuming the serving valve is shut, the material then flows generally inwardly towards the center of the cylinder and then rearwardly through the open central portion as indicated by the curvilinear arrow in Figure 3. Due to swirling currents and centrifugal force the product does not travel rearwardly for the entire length of cylinder, but is again urged forwardly by the screws and repeats this general flow path. In addition to the above described movement however, the material is also beaten as previously described, the retarder preventing the entire mass from turning bodily and thereby creating good turbulence.

The beater assembly is highly efficient in performing the functions of scraping, aerating and feeding the material in an axial direction. A desirable flow pattern is developed with no "blocking" of the product and with the desired turbulence. The beater affords little opportunity for the sticky mix to adhere to it and is of high strength-weight ratio. In this regard it may be noted that if the screws engage an obstruction, in order to bend out of shape, it would be necessary for the long welded joint between the screws and the rings to shear. The rings themselves inherently have high resistance to distortion due to torsional stresses. The entire beater is of smooth design which facilitates product flow and cleaning. It is mounted for easy removal yet is accurately located to hold the operating parts within the required tolerances.

It should be understood that it is not intended to limit the invention to the above described forms and details, and that the invention includes such other forms and modifications as are embraced by the scope of the appended claims.

I claim:

1. A beater for a cylindrical freezer including, helical screws disposed in circumferentially spaced relationship and having front and rear ends, a front ring rigidly secured between and adjacent the front ends of said screws, an intermediate ring rigidly secured between said screws intermediate their length, a rear member rigidly secured between and adjacent the rear ends of said screws and having means forming a driving connection with a rotatable shaft, said screws and said front ring having outward extensions which rotatably support said beater in said freezer, a scraper blade swingably mounted on said rings and said rear member and adapted to contact said freezer.

2. An elongated and generally cylindrical beater for a cylindrical freezer having a substantially horizontal axis, said beater including; helical screws disposed in circumferentially spaced relationship and having front and rear ends defining the length of said beater, a front ring rigidly secured between and adjacent the front ends of said screws, an intermediate ring rigidly secured between said screws intermediate their length, a rear member rigidly secured between and adjacent the rear ends of said screws and having means forming a driving connection with a rotatable shaft, said screws and said front ring having outward extensions which rotatably support said beater in said freezer, a scraper blade swingably mounted on said rings and said rear member and adapted to contact said freezer.

3. In combination with a cylindrical freezer having a generally horizontal axis and a removable front cover plate, an elongated and generally cylindrical beater rotatably mounted within said freezer and having helical screws on its periphery for feeding material in an axial direction towards said cover plate, said beater also having a completely open center for a major portion of its length extending from said plate whereby material may flow therethrough away from said plate, an elongated and stationary retarder fixedly secured to said plate and extending into the open center to create material turbulence when said beater is rotated and at the same time permit unrestricted material flow therethrough in an axial direction, said plate and retarder being removable as a single unit.

4. In combination with a cylindrical freezer having a generally horizontal axis and a removable front cover plate, an elongated and generally cylindrical beater rotatably mounted within said freezer and having helical screws on its periphery for feeding material in an axial direction towards said cover plate, said beater also having a completely open center for a major portion of its length extending from said plate whereby material may flow therethrough away from said plate, an elongated stationary retarder secured to said plate and removable therewith as a unit, said retarder extending into said open center to create material turbulence when said beater is rotated and at the same time permit unrestricted material flow therethrough in an axial direction, said beater also having circumferentially spaced peripheral bearing surfaces on that end adjacent said plate for rotatable support within said freezer, drive means detachably connected with the other end of said beater for accurately locating and rotating said beater.

5. In combination with a cylindrical freezer having a generally horizontal axis and a removable front cover plate, an elongated and generally cylindrical beater rotatably mounted within said freezer and including a pair of axially spaced rings positioned transversely to said axis, said rings having helical screws secured to their periphery for feeding material in an axial direction toward said cover plate, said rings defining a completely open center for a major portion of the beater length extending from said plate whereby material may flow unrestrictingly therethrough away from said plate, an elongated stationary retarder secured to said plate and extending into said open center to create material turbulence when said beater is rotated and at the same time permit unrestricted material flow therethrough.

6. A device as set forth in claim 5 further characterized in that said rings include a mounting bracket, a scraper blade mounted in said brackets.

7. In a generally horizontally disposed freezing drum having a beater for rotating a product therein and also having a removable front cover plate, the improvement residing in a stationary and eccentrically located material retarder rigidly and fixedly secured to said cover plate and adapted to extend into said drum and be removable therefrom together as a unit with said plate.

8. In a generally horizontally disposed freezing drum having a removable front cover plate, the improvement residing in a stationary elongated material retarder rigidly secured to said cover plate and having an eccentrically located portion adapted to extend into the central portion of said drum for a major portion of the drum length and be removable therefrom together with said plate.

9. In a generally horizontally disposed freezing drum having a removable front cover plate, the improvement residing in a stationary elongated material retarder rigidly secured to said cover plate and adapted to extend into said drum and be removable therefrom together with said plate, said retarder comprising a rod-like member of generally U shaped configuration and having a pair of spaced apart legs.

References Cited in the file of this patent

UNITED STATES PATENTS

| 1,294,571 | Thompson | Feb. 18, 1919 |
| 2,004,446 | Mills | June 11, 1935 |
| 2,746,730 | Swenson et al. | May 22, 1956 |